(12) United States Patent
Lampert et al.

(10) Patent No.: US 7,694,796 B2
(45) Date of Patent: Apr. 13, 2010

(54) LOAD-TORQUE LOCK (75) Inventors: Rico Lampert, Farmington Hills, MI (US); Diyap Bueyuekasik, Buehl (DE); Tarek Mili, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 378 days.

(21) Appl. No.: 11/719,353

(22) PCT Filed: Oct. 5, 2005

(86) PCT No.: PCT/EP2005/055014

§ 371 (c)(1),
(2), (4) Date: May 15, 2007

(87) PCT Pub. No.: WO2006/069820

PCT Pub. Date: Jul. 6, 2006

(65) Prior Publication Data

US 2009/0145714 A1    Jun. 11, 2009

(30) Foreign Application Priority Data

Dec. 27, 2004 (DE) .................... 10 2004 062 815

(51) Int. Cl.
F16D 65/14 (2006.01)
F16D 59/00 (2006.01)

(52) U.S. Cl. .................... 192/223.1; 192/223

(58) Field of Classification Search ............... 192/223, 192/223.1
See application file for complete search history.

(56) References Cited

U.S. PATENT DOCUMENTS

| 1,371,361 | A |   | 3/1921 | Gaston |
|---|---|---|---|---|
| 2,873,832 | A | * | 2/1959 | Helm .................. 192/223.1 |
| 3,976,172 | A | * | 8/1976 | F'Geppert ............ 192/223.1 |
| 5,624,013 | A | * | 4/1997 | Tsai .................... 192/223.1 |
| 6,229,233 | B1 |   | 5/2001 | Torii et al. |
| 6,994,199 | B2 |   | 2/2006 | Drewe et al. |
| 2002/0011390 | A1 |   | 1/2002 | Yamamoto et al. |

FOREIGN PATENT DOCUMENTS

| JP | 09242785 | 9/1997 |
|---|---|---|
| WO | 03/054409 | 7/2003 |

\* cited by examiner

*Primary Examiner*—Rodney H Bonck
(74) *Attorney, Agent, or Firm*—Michael J. Striker (57) ABSTRACT The invention relates to a load-torque lock (10) for automatic locking of load-side torques in the event of a drop or discontinuation of a drive-side torque, comprising a housing (11) which is fixed to a chassis and axially oriented means of attack (19), an output shaft (34) and axially oriented means of attack (37) and pivotally mounted clamping bodies (24) which are arrested or clamped by load torques on the housing (11) and are cancelled out by drive-sided torques from the housing bore. In order to obtain a powerful, robust and compact load-torque lock, the means of attack (37) of the output shaft (34) are arranged such that they cooperate with the means of attack (19) of the drive shaft (17) in the event of drive-side torques and cooperate with the clamping bodies (24) in the event of output-side torques.

18 Claims, 6 Drawing Sheets

LOAD-TORQUE LOCK

RELATED ART

The present invention relates to a load torque blocking device for automatically blocking the transmittance of load-side torques.

The large number of known load torque blocking devices includes a group in which the physical blocking effect is based on a clamping or tilting principle, and it is not important that the principle be clearly definable as either clamping or tilting.

Within this group, it is known from U.S. Pat. No. 6,229,233 B1 to locate several clamping rollers on the circumference of a frame-mounted drum of a load blocking clutch, which are moved by a drive part into a neutral position and, when a load torque is produced that exceeds the drive torque, they are pressed by the ramps of a driven part against the wall of the drum. In that position, they create a jam between the driven part and the drum, thereby enabling the clutch to block the transmittance of load torques of this type.

Due to the very small contact surfaces of the clamping rollers on the drum wall, relatively high bearing pressures are produced there, making load blocking clutches of this type suited for use only with limited load torques.

Furthermore, publication WO 03/054409 makes known a load torque blocking device, with which several clamping bolts bear—internally and externally—against an annular, frame-mounted blocking ring wall. The clamping bolts are displaceable via a blocking disk using drive means or driven means such that, when output-side torque is produced, they tilt against the blocking ring walls and block the rotational motion. When drive-side torque is produced, they disengage from the blocking ring walls. High bearing pressures are produced in this case as well, due to the small contact surfaces of the clamping bolts on the blocking ring walls. In addition, the clamping bolts are located on a relatively large radius beyond the drive and driven shafts—which are aligned with each other—on the blocking ring wall, which is enclosed by a housing. A great deal of installation space is therefore required for this system, which can be problematic, particularly in terms of vehicle design.

Self-inhibition is required for safety reasons in many applications of drive engineering, e.g., if the drive fails and high load torques are present, the drive train must be able to remain at a standstill or come to a standstill. Worm gears are often used for this purpose; they are characterized by low-noise, vibration-dampening operation and high step-down ratios. The tooth geometry is chosen specifically to provide a level of friction that ensures that the gearbox functions in a self-inhibiting manner when the efficiency falls below 50%. This also means, however, that more than half of the energy is lost in the form of friction during normal operation. This has a direct effect on the cost and weight of the drives, which are necessarily designed over-sized.

The object of the present invention is to develop a reliable and robust load torque blocking device that—compared with the known systems—has the most favorable relationship possible between the blockable torque and the amount of installation space required, and minimal power loss when the drive-side driving force occurs in either direction of rotation.

ADVANTAGES OF THE INVENTION

The inventive load torque blocking device has the advantage that it results in low power loss at the load torque blocking device given that the engaging means of the drive shaft interact directly with the engaging means of the driven shaft when drive-side torques are produced. A further advantage of the inventive solution is the fact that high load torques are blocked using clamping bodies in a compact design. The clamping bodies are clamped tightly via the load torques over a large surface area on the frame-mounted housing, and/or they are fixed in position against the housing via toothing.

Advantageous refinements and improvements of the inventive features are made possible by the measures listed in the subclaims. To attain a robust design and even distribution of force around the circumference of the load torque blocking device, it is advantageous when an annular cage is axially composed of two ring pieces—which are preferably centered on the drive shaft and/or driven shaft—between which three clamping bodies are pivotably mounted, the clamping bodies being distributed evenly around the circumference.

To design the clamping bodies such that they have the same effect in both directions of rotation, and to prevent the clamping bodies from being actuated by centrifugal forces, it is provided in a refinement of the prevent invention to design the clamping bodies as kidney-shaped clamping plates which are mounted on both sides in bearing bores of the two annular pieces of the cage in the region of their center of gravity using axial pivot pins, and which are adapted to the wall contour of the housing bore via the outer circumference of their two end sections. Advantageously, the clamping bodies include a radially inwardly oriented, axially extending swivel segment in the region of their support, which extends into the engaging means of the driven shaft and has a specified amount of rotational angular play.

To attain a compact design of the load torque blocking device, it is also advantageous when the engaging means of the driven shaft are formed by two axial, radially outwardly oriented driving bars on the circumference, which are separated from each other by a is specified circumferential distance. To drive the annular cage when drive-side torques are produced by the rotating drive shaft, it is provided in an embodiment of the present invention to provide the annular cage—on the inner circumference, in the circumferential region between two clamping bodies—with a radially inwardly oriented, axially extending rotationally-driving rib, which extends into an axial recess in the engaging means of the drive shaft with a specified amount of rotational angular play. The engaging means of the drive shaft are advantageously designed as claw-shaped, axial projections that include two radially outwardly oriented legs—which preferably extend to the inner circumference of the cage—and which are separated from each other by a circumferential distance that forms the axial recess.

For a compact design of the load torque blocking device, it is furthermore advantageous when the claw-shaped projections of the drive shaft engage axially—with a specified amount of rotational angular play—between two driving bars of the driven shaft; the drive shaft and driven shaft are advantageously supported inside each other. The claw-shaped projections are located on the circumference of the drive shaft such that they interact with the bars of the driven shaft when drive-side torques are produced in order to transfer torque directly, and when load-side torques are produced, the bars of the driven shaft interact with the swivel segments of the clamping bodies to fix them in position or clamp them against the housing bore. To ensure reliable functioning of the load torque blocking device, it is also important for the rotational angular play between the drive shaft and driven shaft to be greater than the rotational angular play between the driven shaft and the clamping bodies, and for the latter rotational angular play to be greater than the rotational angular play between the drive shaft and the annular cage.

For an advantageous embodiment of the clamping bodies, it is provided that the kidney-shaped clamping plates are equipped—on the inner side of their end sections—with slants that taper toward the end sections, which interact with a projection on the outer side of the claw-shaped projections of the drive shaft to release the clamping body from the housing and swivel the clamping bodies back to their neutral position. For applications in which larger torques are produced, it is provided that the wall of the housing bore be provided with evenly distributed inner toothing, and to design the end sections of the clamping plates on the outer circumference with a matching toothing that includes at least one tooth. In the simplest configuration and for smaller torques, it is provided to design the wall of the housing bore as a clamping surface, preferably with a high friction coefficient, and to design the end sections of the clamping plates—which are pivotably mounted in the cage—as friction surfaces on the outer circumference.

The axial play of the cage, which is floatably mounted on the drive shaft and/or driven shaft, is most easily limited using appropriate stops in the housing of the load torque blocking device. Since this can result in grinding noises and wear on the housing at higher rotational speeds of the cage, it is provided in an advantageous refinement of the present invention that the axial play of the floatably-mounted cage be limited by a stop on the drive shaft and a stop on the driven shaft. Advantageously, the stop on the drive shaft extends ahead of the drive-side end face of the rotationally-driving ribs of the cage, and the stop on the driven shaft extends behind the end face of the swivel segments of the clamping bodies.

Instead of self-inhibition caused by a permanent power loss in the worm gear, load torques are now diverted to a frame-mounted housing using a frictional or form-fit clamping mechanism.

DRAWING

The present invention is explained below in greater detail, as an example, with reference to the attached drawing.

DESCRIPTION OF THE EXEMPLARY EMBODIMENTS

Figure 1:
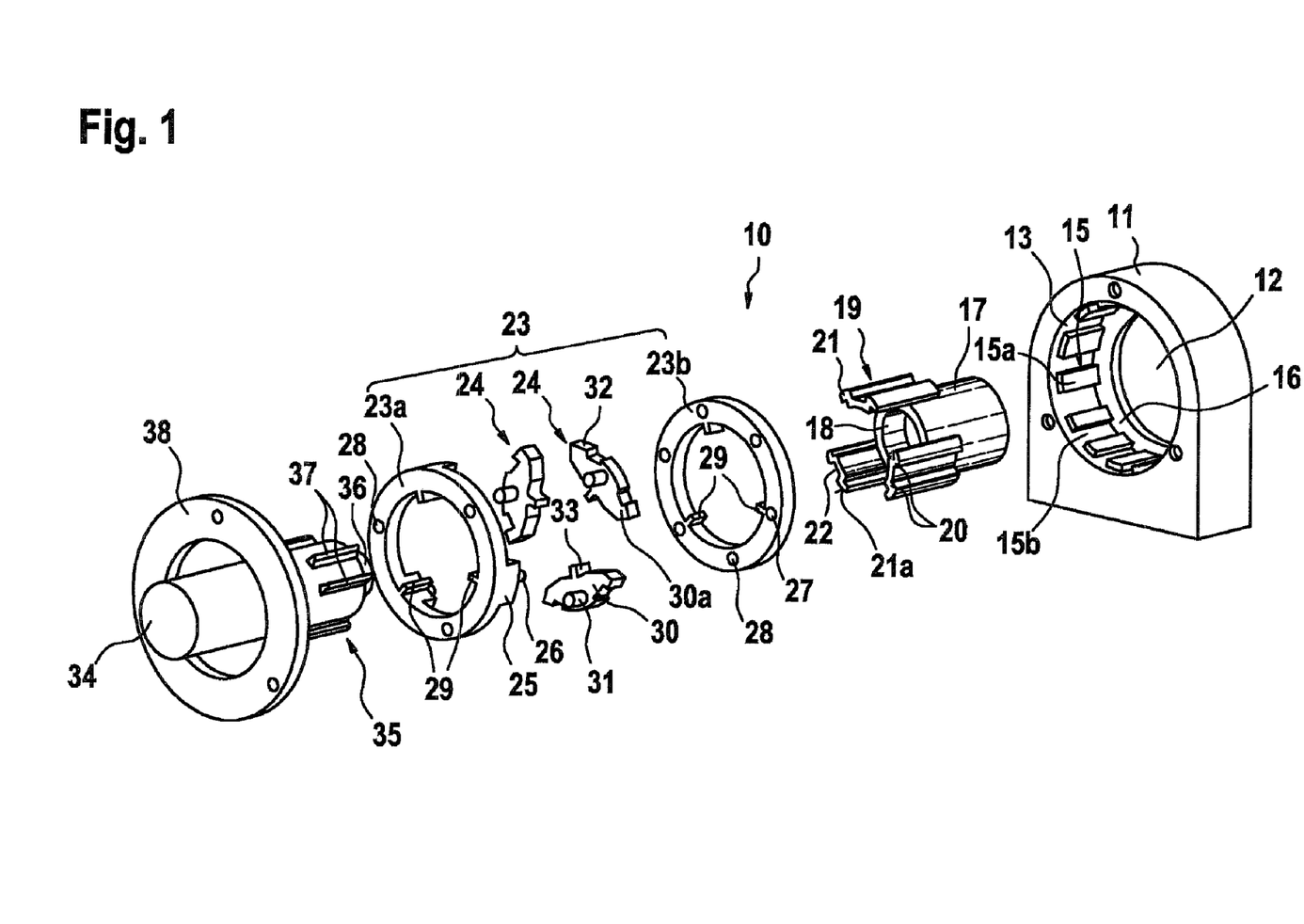
FIG. 1 shows the individual pieces of a load torque blocking device in a spacial depiction and an exploded presentation.
Figure 2:
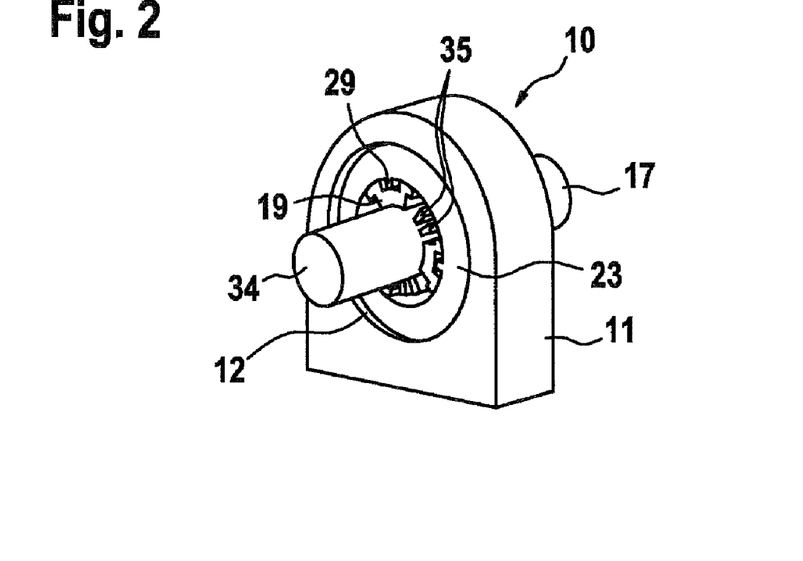
FIG. 2 shows the assembled load torque blocking device in FIG. 1, as the first exemplary embodiment.

FIG. 1 shows the individual pieces of an inventive load torque blocking device, in an exploded view, on an imagined central axis. FIG. 2 shows the individual pieces in FIG. 1 after assembly to form a load torque blocking device, labelled with numeral 10. The load torque blocking device is designed for a very wide range of drive torques and load torques, and is particularly suited for use with electrical drives, as are required in large quantities, e.g., in motor vehicles. When a drive-side torque drops off or ceases, the load torque blocking device should automatically block the driven shaft from rotating in the opposite direction when load-side torques are produced. Load torque blocking device 10 is composed of a frame-mounted housing 11, which, as an alternative, can also be an integral component of a gearbox or a motor housing. Housing 11 has a central bore 12, on wall 13 of which a large number of evenly distributed, radially projecting bars 15a is located. Axially oriented bars 15a form—in combination with intermediate spaces 15b between them—an inner toothing 15. A radial shoulder 16 is located on the rear end of housing bore 12.

FIG. 1 also shows the blocking-side end section of a drive shaft 17, which is rotatably supported in a not-shown drive unit. Drive shaft 17 is provided with a bearing bore 18 and has three engaging means 19, which are distributed evenly around the circumference and are designed as axial, claw-shaped projections. Each engaging means 19 includes two radially outwardly oriented legs 20, which are separated from each other by a specified circumferential distance. A projection 21, which extends in the circumferential direction and has a diagonally-downward sloping projection back 21a, is formed on the ends of leg 20, on the outer side. An axial recess 22 is located between the two legs 20 of claw-shaped engaging means 19.

Two annular pieces 23a, 23b are also shown in FIG. 1; they are assembled to form an annular cage 23 and, between them, three clamping bodies 24 distributed evenly around the circumference are pivotably supported. Annular piece 23a of cage 23 has three axial projections 25, which are distributed evenly around the circumference and point toward the other annular piece 23b; each projection 25 includes a fixing peg 26 on its end face. Fixing pegs 26 are inserted in corresponding fixing bores 27 in annular piece 23b when cage 23 is assembled. Bearing bores 28 for the three clamping bodies 24 are located in the center between projections 25 of left annular piece 23a and between fixing bores 27 of right annular piece 23b. A radially inwardly oriented, axially extending rotationally-driving rib 29 is located on the inner circumference of annular pieces 23a, 23b of cage 23 in the region of projections 25 and/or fixing bores 27. Clamping bodies 24 are composed of kidney-shaped clamping plates 30, which are provided with pivot pins 31—that extend axially on both sides—in the region of their center of gravity. When cage 23 is assembled, pivot pins 31 are accommodated in bearing bores 28 provided therein, thereby pivotably supporting clamping bodies 24 in cage 23. The outer circumference of the two end sections 30a of kidney-shaped clamping plates 30 is designed to match the outer contour of housing bore 12. Therefore, in the present exemplary embodiment, end sections 30a each forms a tooth 32 which can engage in inner toothing 15 of housing bore 12. In the region of their pivot pins 31, clamping bodies 24 each includes a radially inwardly oriented, axially extending swivel segment 33, by way of which clamping bodies 24 can be swiveled via a driven shaft 34 and become fixed in position against housing 11 when load torques are produced.

Similar to the end of drive shaft 17, driven shaft 34 also extends via its end with axially extending engaging means 35 into housing bore 12. Driven shaft 34 is also rotatably supported in a not-shown, frame-mounted bearing and includes a pivot pin 36 on its end-face end, which is inserted in bearing bore 18 of drive shaft 17 when the load torque blocking device is assembled. Engaging means 35 of driven shaft 34 are formed by two radially outwardly oriented, axially extending driving bars 37 on the circumference, which are separated from each other by a specified circumferential distance. A stop ring 38 is also shown in FIG. 1. After the load torque blocking device is assembled, stop ring 38 is screwed into place on the front end face of housing 11 and forms an axial stop for cage 23, which is composed of annular pieces 23a, 23b.

FIG. 2 shows load torque blocking device 10 in the assembled state, but without front stop ring 38, thereby allowing a view of housing bore 12 with cage 23 located therein. Cage 23 is floatably mounted on claw-shaped engaging means 19 of drive shaft 17. FIG. 2 also shows that rotationally-driving ribs 29 of cage 23 interact with engaging means 19 of drive shaft 17 in order to drive cage 23 when drive shaft 17 rotates.

When load torque blocking device 10 is assembled, rotationally-driving ribs 29 are inserted in axial recesses 22 of engaging means 19 on drive shaft 17, and when driven shaft 34 is inserted in bearing bore 18 of drive shaft 17, bars 37 located on its circumference are inserted between a claw-shaped engaging means 19 on drive shaft 17 and a swivel segment 33 on clamping body 24.

The mode of operation of load torque blocking device 10 will be explained in greater detail with reference to FIGS. 3 through 6. They each show a cross section through load torque blocking device 10 as viewed from the driven side.

Figure 3:
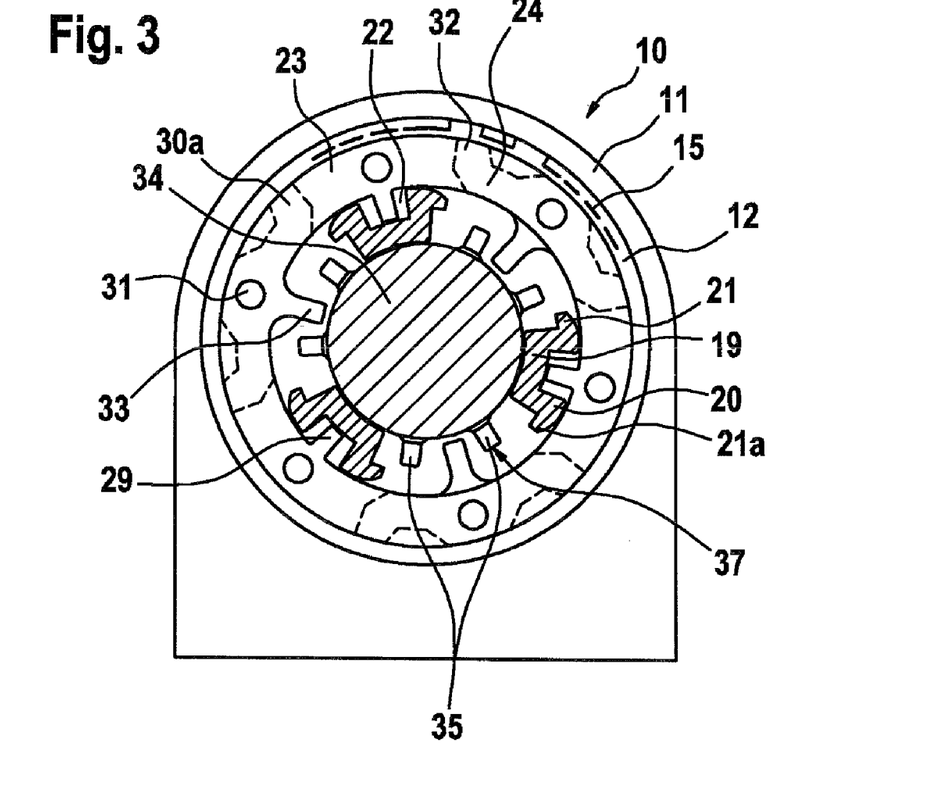
FIG. 3 shows the load torque blocking device in FIG. 2 in an enlarged depiction, in a cross section and in a neutral resting position.

FIG. 3 shows the cross section through load torque blocking device 10 in its neutral resting position. Each rotationally-driving rib 29 of cage 23 extends into a recess 22 of claw-shaped engaging means 19 on the end of drive shaft 17. Given that recess 22 is wider, rotational angular play exists between rotationally-driving ribs 29 and engaging means 19 of drive shaft 17. FIG. 3 also shows that claw-shaped engaging means 19 of drive shaft 17 are located between two driving bars 37 of driven shaft 34 with a specified amount of rotational angular play. Swivel segments 33 of clamping bodies 24 also extend—with a specified amount of rotational angular play— between two driving bars 37 of driven shaft 34. Clamping bodies 24 assume a central position, in which their teeth 32 are disengaged from inner toothing 15 of housing bore 12.

Figure 4:
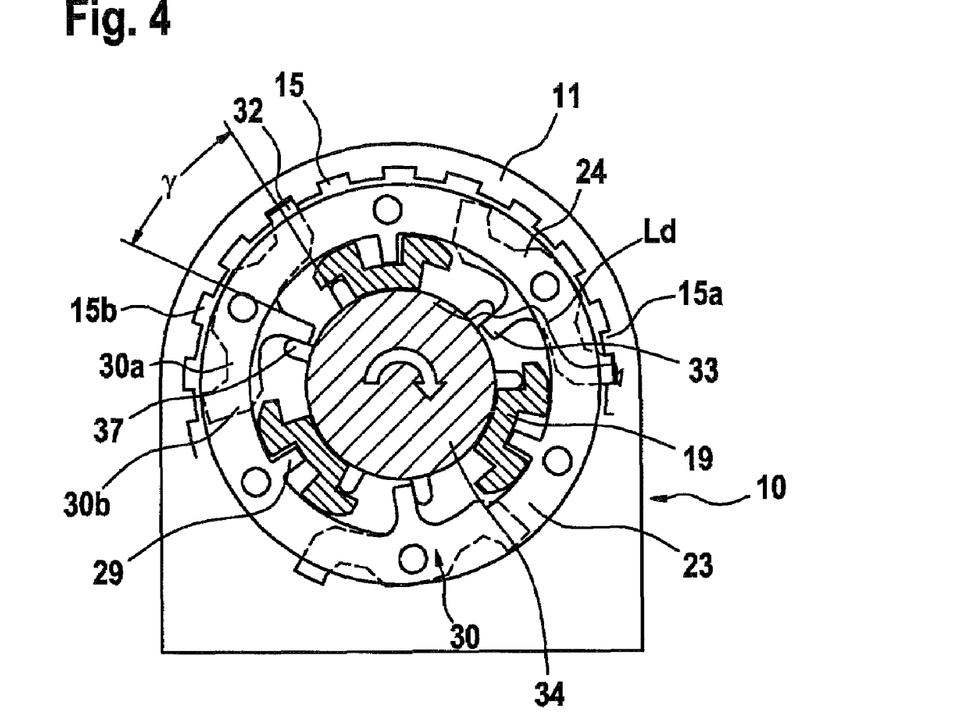
FIG. 4 shows the load torque blocking device in FIG. 2 when a load torque is applied in the clockwise direction.

FIG. 4 shows a cross-section through load torque blocking device 10 when a load torque is produced by driven shaft 34 and acts in the clockwise direction. Driven shaft 34 rotates in the clockwise direction until every other of the six driving bars 37 on the circumference of driven shaft 34 bears against a swivel segment 33 of clamping body 24 and thereby swivels clamping bodies 24 on their pivot pins 31. Rear—as viewed in the direction of rotation of driven shaft 34—tooth 32 of clamping body 24 disengages radially outwardly from the outer circumferential region of cage 23 and engages in the next gap 15b between bars 15a of inner toothing 15 on housing bore 12. Engaging means 19 on drive shaft 17 are also driven by the three remaining driving bars 37 of driven shaft 34 by a few degrees in the clockwise direction. As shown in FIG. 4, rotationally-driving ribs 29 therefore no longer bear against the wall in recesses 22 of engaging means 19. If teeth 32 of clamping bodies 24 are located directly underneath a bar 15a of inner toothing 15, however, entire cage 23 is driven— via swivel segments 33, and by bars 37 of driven shaft 34, which interact with swivel segments 33—until teeth 32 engage in the next gap 15b of inner toothing 15. In this position, as shown, load torque Ld is diverted from driven shaft 34 into housing 11 of load torque blocking device 10. The driven motion is therefore halted and the driven torque is no longer transferred to the drive side of load torque blocking device 10.

A configuration of load torque blocking device 10 that is a mirror image to that shown in FIG. 4 results when a load torque is produced on driven shaft 34 in the counterclockwise direction. Since swivel segments 33 of clamping bodies 24 are located between two driving bars 37 of driven shaft 34, rotational angular play γ exists between them. This rotational angular play γ must also be passed through by driven shaft 34 before clamping bodies 24 can be displaced by bars 37 of driven shaft 34 into their locked position shown in FIG. 4.

Figure 5:
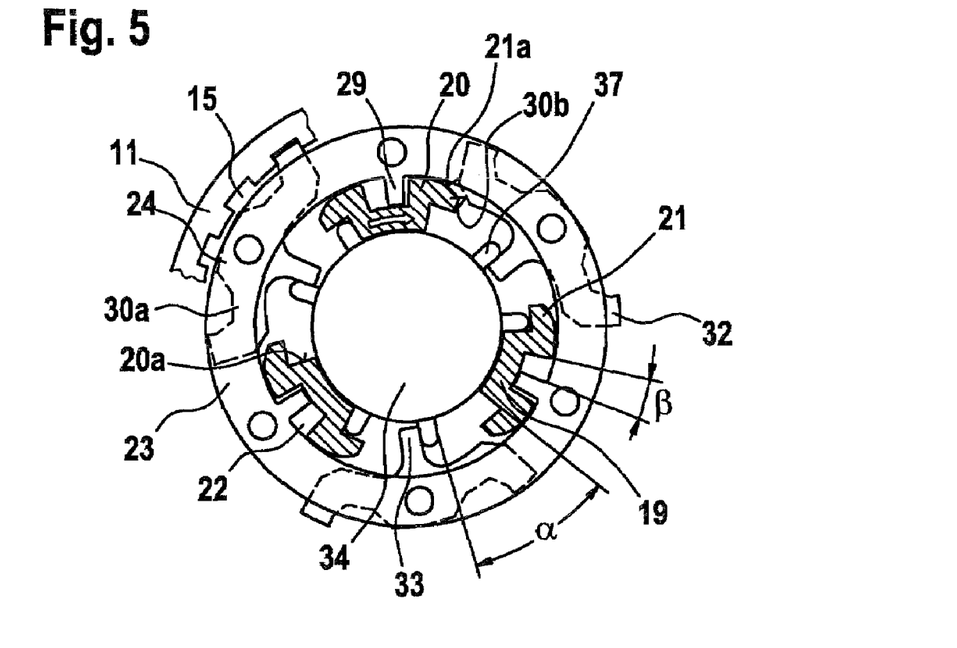
FIG. 5 shows the load torque blocking device when a drive torque is applied in the clockwise direction.

FIG. 5 also shows the cross-section of load torque blocking device 10 in its locked position shown in FIG. 4. It will be used to describe the mode of operation when a drive-side torque is produced. In this case, the drive shaft and, with it, its claw-shaped engaging means 19, are rotated in the clockwise direction. When this happens, a projection 21 of leg 20 slides—via its projection back 21a—under a slant 30b of clamping body 24 that tapers toward an adjacent end section 30a and swivels it back into its neutral position, as shown in FIG. 3. Tooth 32 of clamping body 24 is disengaged from inner toothing 15 on housing 11, thereby releasing cage 23. When drive shaft 17 is rotated, a rotational angular play β is also passed through, in which rotationally-driving ribs 29 of cage 23 are located in recess 22 between the two legs 20 of claw-shaped engaging means 19. Engaging means 19 of drive shaft 17 must also pass through a rotational angular play α until outer wall 20a of leg 20 of claw-shaped engaging means 19 located in the front—as viewed in the direction of rotation—bears against the next bar 37 of driven shaft 34. As soon as this is the case, drive-side engaging means 19 immediately interact with bars 37 of driven shaft 34 and drive driven shaft 34. The torque is thereby transferred directly from drive shaft 17 to driven shaft 34, and cage 23 with clamping bodies 24 is driven loosely only via rotationally-driving ribs 29 and legs 20 of claw-shaped engaging means 19.

Figure 6:
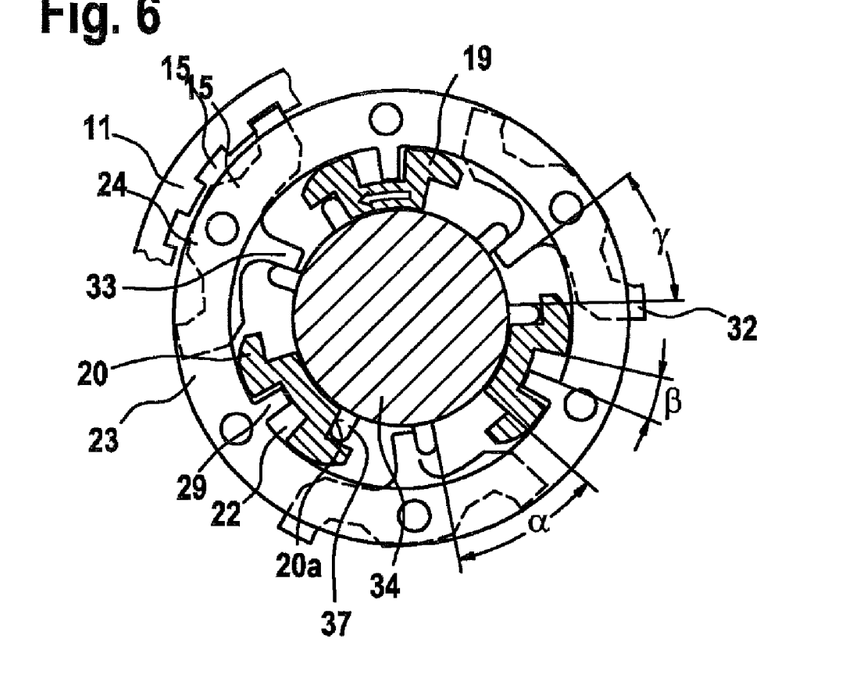
FIG. 6 shows the load torque blocking device when the drive torque is applied in the counterclockwise direction.

The function of load torque blocking device 10 that occurs when torque is produced in the counterclockwise direction by drive shaft 17 will now be explained with reference to FIG. 6. The starting position is the same as it is in FIGS. 4 and 5. This means, the load torque blocking device is first located in its locked position, in which a tooth 32 of clamping body 24 engages in inner toothing 15 of housing bore 12. In this position, each of the three engaging means 19 of drive shaft 17 already bear against a bar 37 of the driven shaft 34 via their outer—as viewed in its direction of rotation—wall 20a. When drive shaft 17 rotates in the left-hand direction, driven shaft 34 is therefore driven directly. During this rotation in the counterclockwise direction, the other three driving bars 37 of driven shaft 34 also move away from swivel segments 33 of the three clamping bodies 24 until rotationally-driving ribs 29 of cage 22 come to bear against the right-hand wall of recesses 22 in engaging means 19 of drive shaft 17. The clamping bodies are thereby released from their locked position. When drive shaft 17 is started rotating, the three rotationally-driving ribs 29 of cage 23, which extend into recesses 22 of claw-shaped engaging means 19, are now also driven by rear leg 20. Due to the beveled rear flank of teeth 32 on the ends of clamping bodies 24, the latter now glide out of inner toothing 15 of housing 11 as a result of the left-handed rotation of cage 23, and swivel clamping bodies 24 into their neutral position as shown in FIG. 3. As an alternative, clamping bodies 24 can also be released from their locked position when drive shaft 17 is first rotated by a few degrees to the right, in the clockwise direction. Then, as explained with reference to FIG. 5, projections 21 of claw-shaped engaging means 19 slide under clamping bodies 24 and swivel them into their neutral position. The drive motion then takes place in the counterclockwise direction.

Since various starting positions of load torque blocking device 10 are also possible when drive shaft 17 rotates in the left-handed direction, the components that are rotatable relative to each other must also have certain amounts of rotational angular play. Rotational angular play a between drive shaft 17 and driven shaft 34 is chosen to be greater than rotational angular play $\gamma$ between driven shaft 34 and clamping bodies 24. In addition, rotational angular play $\gamma$ is greater than rotational angular play $\beta$ between drive shaft 17 and cage 23.

Figure 7:
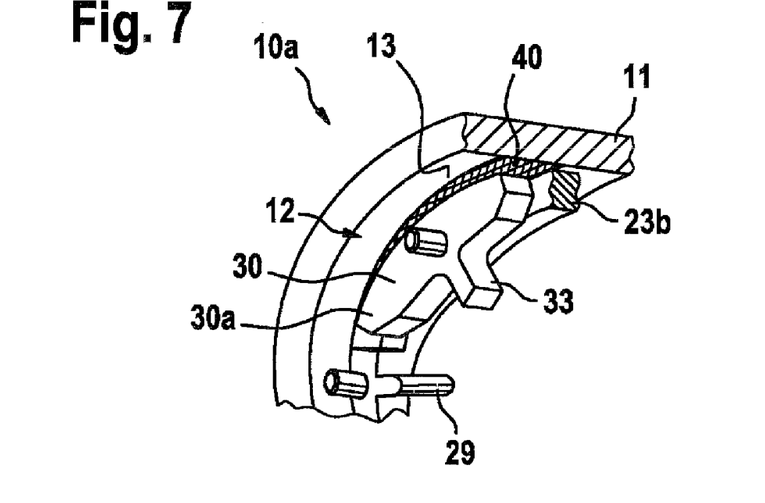
FIG. 7 shows an enlarged, spacial, cut-away view of the housing with a clamping body and a cage-ring piece, as the second exemplary embodiment.
Figure 8:
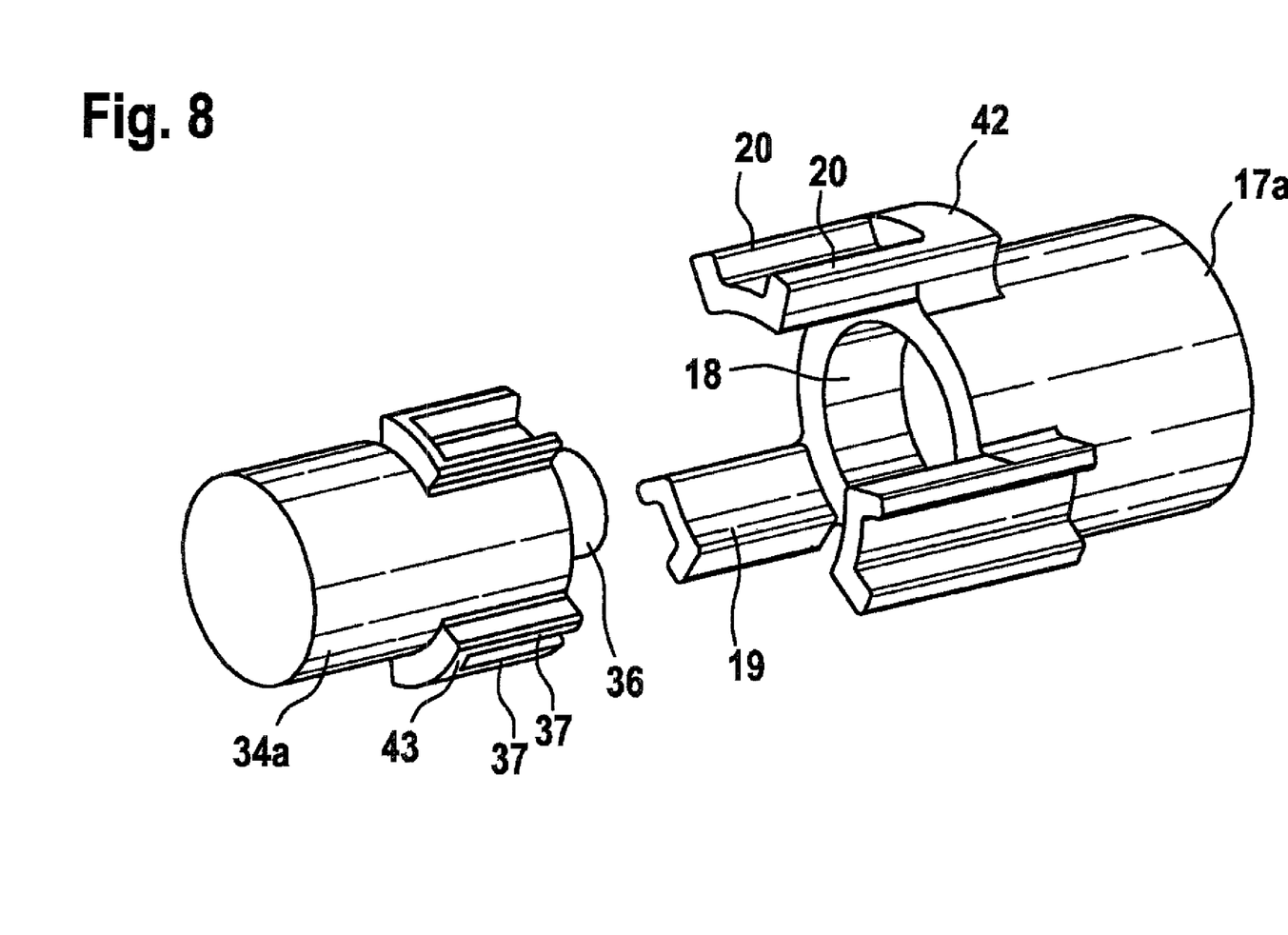
FIG. 8 shows a spacial, enlarged depiction of the ends of the drive shaft and driven shaft before they are assembled to form the second exemplary embodiment.
Figure 9:
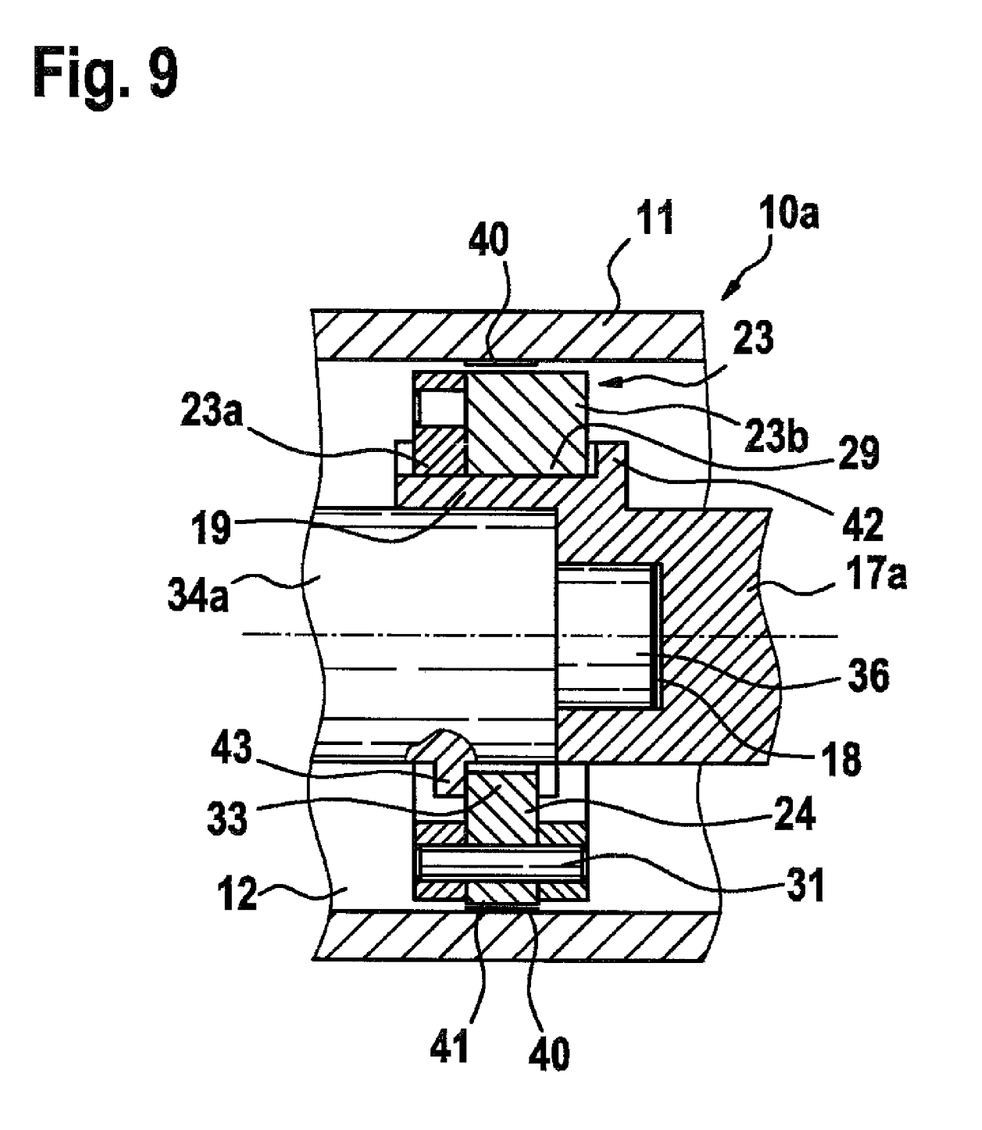
FIG. 9 shows a longitudinal cross-section through the assembled load torque blocking device of the second exemplary embodiment.

FIGS. 7 through 9 show a modified load torque blocking device 10a, as a second exemplary embodiment of the present invention. FIG. 7 shows a cut-away view of load torque blocking device 10 in a spacial depiction, without the drive shaft or driven shaft. It is clear that housing 11 includes a clamping surface 40 with a high friction coefficient—instead of an inner toothing—on wall 13 of housing bore 12. In addition, end sections 30a of clamping plates 30 which are pivotably supported in the cage are provided with a friction surface 41 on the outer circumference, instead of with teeth 32, as in the exemplary embodiment. With this design, smaller load torques, up to 0.5 Nm, can be handled by load torque blocking device 10a.

The ends of drive shaft 17a and driven shaft 34a in the modified design of the first exemplary embodiment are shown in FIG. 8, in an enlarged, spacial depiction. The two legs 20 are interconnected at their rear end by a wall 42 on the axially projecting, claw-shaped engaging means 19 on the end of drive shaft 17a. Driving bars 37 located in pairs on the circumference of driven shaft 34a, with a smaller distance between them, are interconnected in the same manner at their rear end by a wall 43.

In FIG. 9, in which load torque blocking device 10a is shown in the assembled state and in a longitudinal cross-section, walls 42 and 43 form a stop on drive shaft 17a and driven shaft 34a, with which the axial play of floatably-mounted cage 23 is limited. Wall 42 of drive shaft 17a extends ahead of the drive-side end face of rotationally-driving ribs 29 of cage 23, and wall 43 of driven shaft 34a extends ahead of the end face of swivel segments 33 on clamping bodies 24.

A large number of different embodiments for non-rotatably absorbing load torques is possible within the framework of the present invention, ranging from rectangular inner toothing 15 of housing bore 12 in the first exemplary embodiment to clamping surface 40 on wall 13 of housing bore 12 in the second exemplary embodiment. For example, when drive-side torques are produced, the disengagement of load torque blocking device 10 can be improved by providing the ends of clamping bodies 24 with a sawtooth contour. It can also be advantageous to insert return springs between cage 23 and clamping bodies 24, which hold the clamping bodies in their neutral position or return them to this position when the load torque drops off. This also reliably prevents clamping bodies 24 from swiveling independently during normal operation due to rotational acceleration of cage 23 to be driven. The ends of the drive shaft and driven shaft can be realized as forged parts or as attachments made of plastic parts, which are installed on the shaft ends via form-fit or frictional connections. In a preferred application in an electrical drive unit with reduction gears, the load torque blocking device—which is designed as a one-way clutch—can also be inserted between the motor and the gearbox and between the gearbox and the driven shaft. With a worm gear with a relatively large worm wheel, claw-shaped engaging means 19 can be located, e.g., on the end face instead of on a drive shaft, thereby allowing them to be integrated in the hub geometry of the worm wheel when it is manufactured. Cage 23 is placed on the claw-shaped engaging means and is floatably supported, and the axial inner toothing is placed in a region of the gearbox housing that encloses cage 23 with clamping bodies 24.

What is claimed is:

1. A load torque blocking device for automatically blocking load-side torques when a drive-side torque drops off or ceases, while retaining the ability to transfer drive-side torques, that includes a frame-mounted housing (11) with a central housing bore (12), a rotatably mounted drive shaft (17), which extends into the housing bore with axially extending engaging means (19), a rotatably mounted driven shaft (34), which also extends into the housing bore with axially extending engaging means (37), and with a plurality of clamping bodies (24) located eccentrically in the housing bore and axially supported in an annular cage (23), which are pivotably mounted such that they are capable of being locked in position or fixedly clamped against a wall of the housing bore via load-side torques of the engaging means of the driven shaft, and which are capable of being disengaged from the wall of the housing bore and driven in a circulating manner via drive-side torques of the engaging means of the drive shaft, wherein the engaging means (37) of the driven shaft (34) are located such that they interact with the engaging means (19) of the drive shaft (17) when drive-side torques are produced, and such that they interact with the at least one clamping body (24) when output-side torques are produced, wherein the annular cage (23) is configured such that the plurality of clamping bodies (24) are pivotably mounted and distributed evenly around a circumference, and wherein each of the plurality of clamping bodies (24) include swivel means (33) configured to interact with the engaging means (37) of the driven shaft (34) when load-side torques are produced.

2. The load torque blocking device as recited in claim 1, wherein the engaging means (37) of the driven shaft (34) is formed by two axial, radially outwardly oriented driving bars on a circumference, which driving bars are separated from each other by a specified circumferential distance.

3. The load torque blocking device as recited in claim 1, wherein each of the plurality of clamping bodies (24) is mounted in the housing bore (12) on the engaging means (19) of the drive shaft (17) and include driving devices (29) that interact with the engaging means (19) of the drive shaft (17) when drive-side torques are produced.

4. The load torque blocking device as recited in claim 3, wherein the annular cage (23) is axially composed of two annular components (23a, 23b).

5. The load torque blocking device as recited in claim 4, wherein each of the plurality of clamping bodies (24) comprises kidney-shaped clamping plates (30), which are pivotably mounted on both sides in a center of gravity region using axial pivot pins (31), on both annular components (23a, 23b) of the cage (23), and which are adapted to a wall contour of the housing bore (12) via an outer circumference of two end sections (30a).

6. The load torque blocking device as recited in claim 5, wherein each of the plurality of clamping bodies (24) further comprises, in the region of their pivot pins (31), a radially inwardly oriented, axially extending swivel segment (33), which extends between two axial driving bars (37) of the driven shaft (34) and has a specified amount rotational angular play (α).

7. The load torque blocking device as recited claim 3, wherein the annular cage (23) includes, on an inner circumference, in a circumferential region located between two of the plurality of clamping bodies (24), a radially inwardly oriented, axially extending rotationally-driving rib (29), which extends into an axial recess (22) in the engaging means (19) of the drive shaft (17) and has a specified amount of rotational angular play (β).

8. The load torque blocking device as recited in claim 7, wherein the engaging means (19) of the drive shaft (17) is claw-shaped and includes two radially outwardly oriented, axially extending legs (20), which are separated from each other by a circumferential distance that forms the axial recess (22).

9. The load torque blocking device as recited in claim 8, wherein the claw-shaped engaging means (19) of the drive shaft (17) engage, with a specified amount of rotational angular play (α), between two driving bars (37) of the driven shaft (34); the drive shaft (17) and driven shaft (34) are supported one inside another.

10. The load torque blocking device as recited in claim 9, wherein the drive-side engaging means (19) projects axially on the end of the drive shaft (17) and extends, with a specified amount of rotational angular play (α), between two adjacent driving bars (37) of the driven shaft.

11. The load torque blocking device as recited in claim 10, wherein the rotational angular play (α) between the drive shaft (17) and the driven shaft (34) is greater than the rotational angular play (γ) between the driven shaft (34) and the clamping bodies (24), and the latter rotational angular play (γ) is greater than the rotational angular play (β) between the drive shaft (17) and the cage (23).

12. The load torque blocking device as recited in one of the claim 5, wherein the kidney-shaped clamping plates (30) have, on an inner side of respective end sections (30a), a slant (30b) that tapers toward the end sections, which interacts with a projection (21) on an outer wall (20a) of the claw-shaped engaging means (19) of the drive shaft (17) to release the clamping bodies (24) from the housing (11) and swivel the clamping bodies (24) back to a neutral position.

13. The load torque blocking device as recited in claim 5, wherein a wall (13) of the housing bore (12) is provided with an evenly spaced inner toothing (15), and the end sections (30a) of the clamping plates (30) include a matching toothing with at least one tooth (32) on an outer circumference.

14. The load torque blocking device as recited in claim 5, wherein a wall (13) of the housing bore (12) is a clamping surface (40) and the end sections (30a) of the clamping plates (30) are designed as a friction surface (41) on the outer circumference.

15. The load torque blocking device as recited in one of the claim 6, wherein the axial play of the cage (23) is limited by a stop (42, 43) on the drive shaft (17) and the driven shaft (34).

16. The load torque blocking device as recited in claim 15, wherein the stop (42) of the drive shaft (17) extends ahead of the drive-side end face of the rotationally-driving ribs (29) of the cage (23), and the stop (43) of the driven shaft (34) extends behind the end face of the swivel segments (33) of the clamping bodies (24).

17. The load torque blocking device as recited in claim 3, wherein the at least one clamping body (24) is mounted on the engaging means (19) of the drive shaft (17) in a floating manner.

18. The load torque blocking device as recited in claim 8, wherein the two radially outwardly oriented, axially extending legs (20) extend to the inner circumference of the cage (23).

* * * * *